(12) United States Patent
Sugeta (10) Patent No.: US 6,809,796 B2
(45) Date of Patent: Oct. 26, 2004

(54) IMAGE READING APPARATUS AND CONTROL PROGRAM

(75) Inventor: Mitsuhiro Sugeta, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/459,090

(22) Filed: Jun. 11, 2003

(65) Prior Publication Data

US 2003/0231288 A1 Dec. 18, 2003

(30) Foreign Application Priority Data

Jun. 13, 2002 (JP) ........................................ 2002-173028

(51) Int. Cl.$^7$ .......................... G03B 27/52; G03B 27/00
(52) U.S. Cl. .......................................... 355/40; 355/407
(58) Field of Search ............................. 355/40, 41, 407, 355/27, 408; 358/406, 461, 474, 446; 399/82, 371; 271/264

(56) References Cited

U.S. PATENT DOCUMENTS 5,120,039 A * 6/1992 Yamada ................. 271/4.01
6,120,017 A * 9/2000 Tanjo et al. ............ 271/105
6,323,933 B1 * 11/2001 Anzai ..................... 355/23

FOREIGN PATENT DOCUMENTS

JP 2000-151925 5/2000

* cited by examiner

Primary Examiner—Henry Hung Nguyen
(74) Attorney, Agent, or Firm—Morgan & Finnegan, LLP

(57) ABSTRACT

An object of this invention is to properly set an original reading position in sheetfed scanning. To achieve this object, a background near a sheetfed scanning position is read to detect the distal end of a white sheet member arranged near a platen roller, and the reading position in sheetfed scanning is set.

10 Claims, 9 Drawing Sheets

IMAGE READING APPARATUS AND CONTROL PROGRAM

FIELD OF THE INVENTION

The present invention relates to an image reading apparatus such as a copying machine, scanner, or facsimile apparatus, and a control program therefor and, more particularly, to an image reading apparatus for reading an original while moving the original with an optical scanning unit being stopped, i.e., a technique of setting the stop position of the optical scanning unit.

BACKGROUND OF THE INVENTION

As a conventional image reading apparatus such as a copying machine, scanner, or facsimile apparatus, there is known an apparatus having a so-called sheetfed scanning function of reading an original (original information or original image) while moving the original by an ADF (Auto Document Feeder) in a state in which an optical scanning unit for irradiating an original with light is stopped at a predetermined original reading position. The ADF is generally provided as an option, and is detachable from the original reading apparatus main body.

In an image reading apparatus of this type, a desired positional relationship may not be obtained between the ADF and the original reading position in the original reading apparatus main body owing to variations in ADF attaching position and building components.

According to a known method of adjusting the positions, as disclosed in, e.g., Japanese Patent Laid-Open No. 2000-151925, the optical scanning unit is sequentially stopped near an ADF convey roller (platen roller) to irradiate the convey roller with light. Reflected light is read by a photoelectric conversion device such as a CCD image sensor in the image reading apparatus main body. A stop position where reflected light maximizes is set as an original reading position.

According to the conventional method, however, the original reading position may be erroneously detected due to contamination of the platen roller, electrical noise of the original reading apparatus main body, or the like. This leads to image degradation such as a shift of the leading end of an image or a blurred image in original scanning.

The optical scanning unit is sequentially stopped near the ADF platen roller, the platen roller is irradiated with light, and reflected light is read by a CCD. At this time, if the reflected light quantity is small at all stop positions, the erroneous detection probability becomes high.

SUMMARY OF THE INVENTION

The present invention has been made to overcome the conventional drawbacks, and has as its object to properly set an original reading position in sheetfed scanning.

To solve the above problem and achieve the above object, according to the first aspect of the present invention, an image reading apparatus is characterized by comprising an optical scanning device which optically scans an original, a moving device which moves a position of the optical scanning device, a photoelectric conversion device which photoelectrically converts an optical image obtained by the optical scanning device, a platen roller which conveys the original, a sheet member which is arranged near the platen roller, a detection device which detects an end position of the sheet member by scanning the sheet member and reading the sheet member by the photoelectrical conversion device while moving the position of the optical scanning device by the moving device, and a setting device which sets, on the basis of a detection result of the detection device, a stop position of the optical scanning device when the original conveyed by the platen roller is read by the photoelectric conversion device while the optical scanning device stops.

According to the second aspect of the present invention, a control program for controlling an image reading apparatus having an optical scanning device which optically scans an original, a moving device which moves a position of the optical scanning device, a photoelectric conversion device which photoelectrically converts an optical image obtained by the optical scanning device, a platen roller which conveys the original, and a sheet member which is arranged near the platen roller is characterized by comprising a detection step of scanning the sheet member while moving the position of the optical scanning device by the moving device, reading the sheet member by the photoelectrical conversion device, and detecting an end position of the sheet member, and a setting step of setting, on the basis of a detection result in the detection step, a stop position of the optical scanning device when the original conveyed by the platen roller is read by the photoelectric conversion device while the optical scanning device stops.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS (First Embodiment)

The first embodiment of the present invention will be described below with reference to the accompanying drawings.

Figure 1:
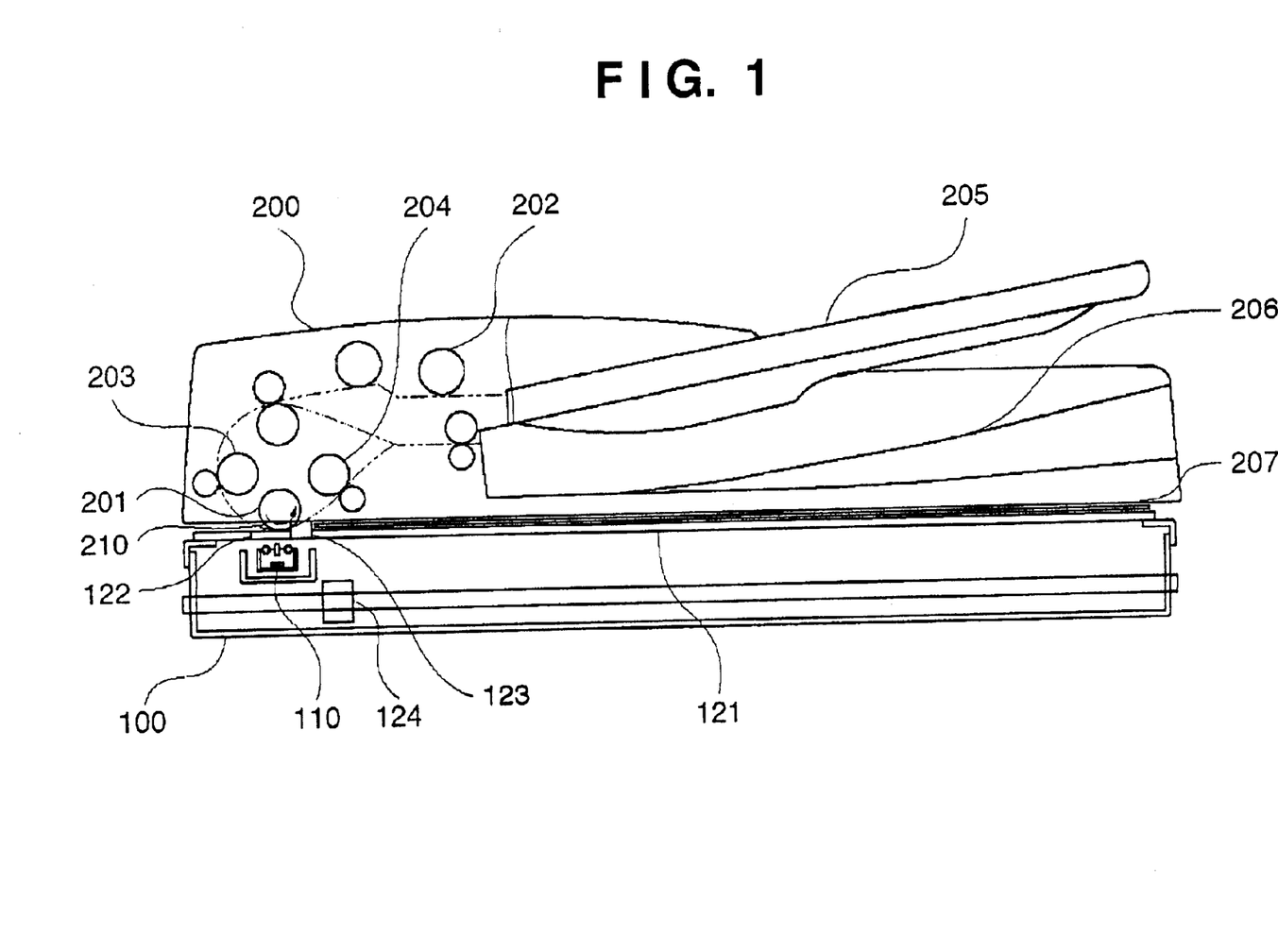
FIG. 1 is a sectional view showing the schematic arrangement of an image reading apparatus according to an embodiment of the present invention.
Figure 2:
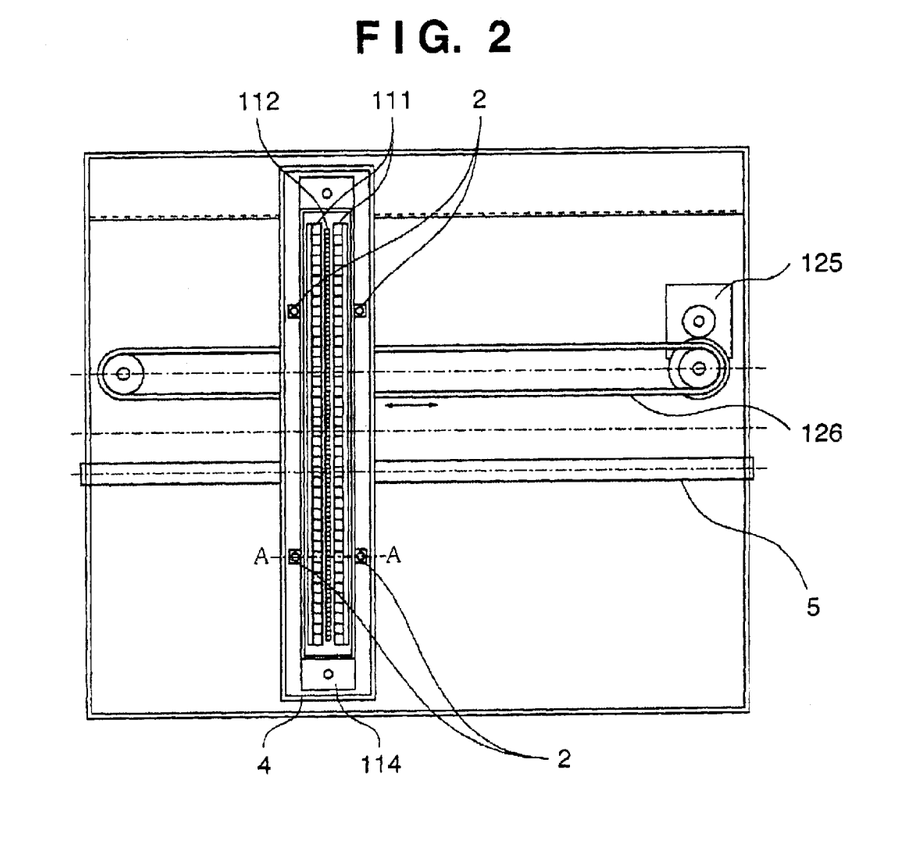
FIG. 2 is a plan view showing the reading section of the image reading apparatus according to the embodiment of the present invention when viewed from the top.
Figure 3:
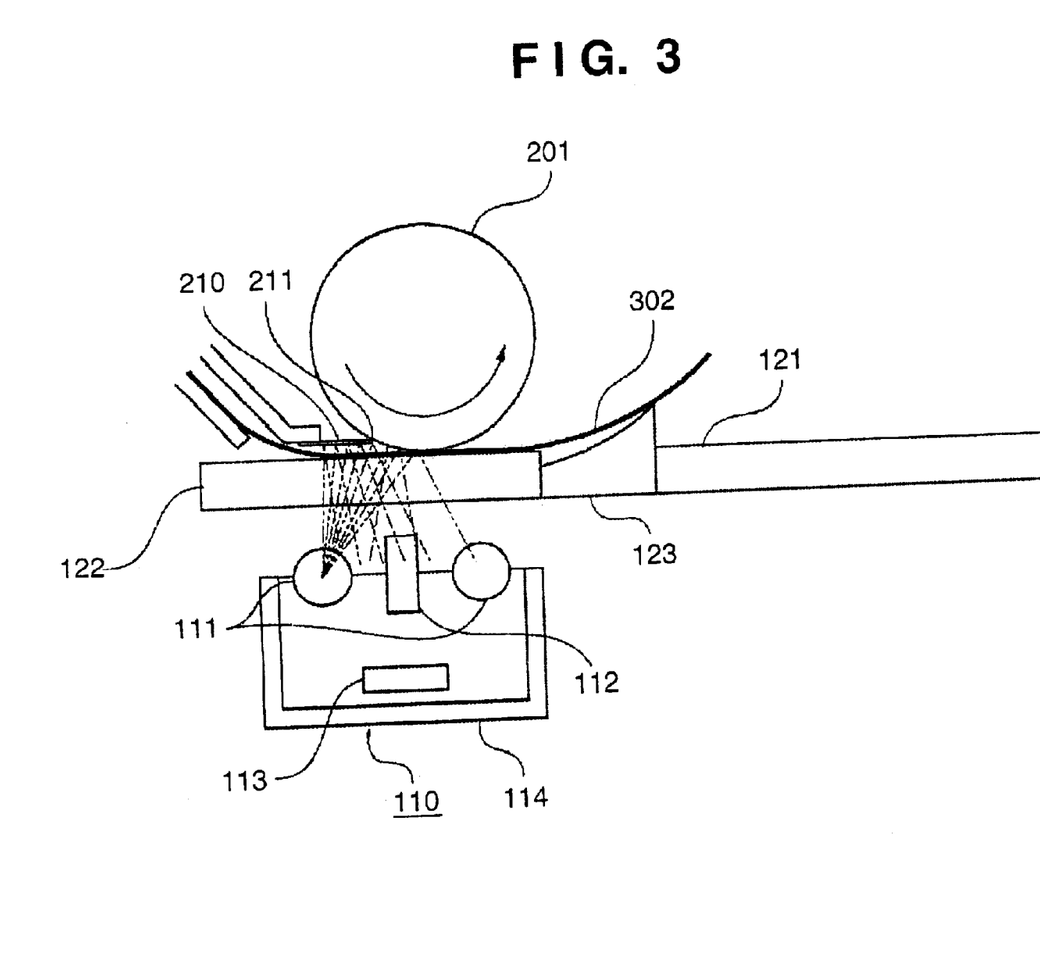
FIG. 3 is a sectional view showing in detail the sheetfed scanning section of the image reading apparatus according to the embodiment of the present invention.

FIG. 1 is a sectional view showing the schematic arrangement of an image reading apparatus to which the present invention is applied. The image reading apparatus comprises an image reading apparatus 100, and an ADF 200 which is detachable from the image reading apparatus 100. FIG. 2 is a plan view showing the reading section of the image reading apparatus 100 when viewed from the top. FIG. 3 is a sectional view showing in detail the sheetfed scanning section of the image reading apparatus 100.

The ADF 200 conveys an original set on a feed tray 205 to a sheetfed scanning glass plate 122 of the image reading apparatus 100 by convey rollers 203 and 204, and then recovers the original. At this time, the original passes between a platen roller 201 attached to the ADF 200 and the sheetfed scanning glass plate 122 of the image reading apparatus 100. During the passage, the original is optically scanned by a contact image sensor (to be referred to as a CIS hereinafter) 110 in the image reading apparatus 100 to read original information.

As shown in FIG. 3, the CIS 110 comprises a lamp 111 which emits light to the original surface, a lens 112 for guiding, to an image sensor 113 serving as a photoelectric conversion device, light reflected by (or transmitted through) the original irradiated by the lamp 111, and the image sensor 113. The lamp 111, lens 112, and image sensor 113 are integrally stored in a casing 114.

As shown in FIG. 2, the CIS 110 is connected to a motor 125 via a timing belt 126. By rotating and driving the motor 125, the CIS 110 moves parallel to a glass original table 121 and the sheetfed scanning glass plate 122. A position sensor 124 detects the home position of the CIS 110. The motor 125 is rotated in a forward or opposite direction on the basis of the position of the position sensor 124 serving as a reference. The CIS 110 then moves to optically scan an original on the glass original table 121 or sheetfed scanning glass plate 122.

The motor 125 is comprised of a stepping motor. The motor 125 is connected to an encoder 402 (see FIG. 4). An output from the encoder 402 allows recognizing the number of pulses by which the CIS 110 has moved. In other words, the position of the CIS 110 can be detected from a detection output from the position sensor 124 and an encoder pulse from the encoder 402.

Light reflected by (or transmitted through) an original is guided to the SELFOC lens 112, and condensed on the image sensor 113. The image sensor 113 photoelectrically converts reflected light containing original information, and outputs an electronic image signal.

With this arrangement, original information can be read in two modes: an ADF original reading (sheetfed scanning) mode in which original image information is read while the CIS 110 stops at an original reading position and an original is conveyed by the ADF 200, and a glass original table original reading (stationary reading) mode in which original information is read while the original is stationarily set on the glass original table 121 and the CIS 110 is moved in a subscanning direction.

FIG. 3 is a view showing an arrangement near the CIS 110 used in the first embodiment. The ADF 200 of the first embodiment comprises a white sheet member 210 which is arranged near the platen roller 201 on the upstream side of the platen roller 201 in the original convey direction. The white sheet member 210 is a polyester film such as Mylar (available from Teijin DuPont Films). The white sheet member 210 is arranged almost parallel to the sheetfed scanning glass plate 122. Note that the white sheet member may be another member (e.g., white paper) other than the polyester film.

A distal end position 211 where the white sheet member 210 comes closest to the platen roller 201 is arranged slightly apart from the platen roller 201 so as not to contact the platen roller 201. The white sheet member 210 is arranged at a position where the white sheet member 210 covers part of the surface of the platen roller 201 in almost the entire image reading range of the CIS 110 in the main scanning direction when the platen roller 201 and white sheet member 210 are viewed from the CIS 110 in the reading direction of the CIS 110 (i.e., direction perpendicular to the sheetfed scanning glass plate 122).

In the ADF original reading (sheetfed scanning) mode, the reading position (stop position) of the CIS 110 is set to a position where the CIS 110 can read a portion of the surface of the platen roller 201 that is not covered with the white sheet member 210 when no original is conveyed. The distal end position 211 of the white sheet member 210 may contact the platen roller 201.

Figure 4:
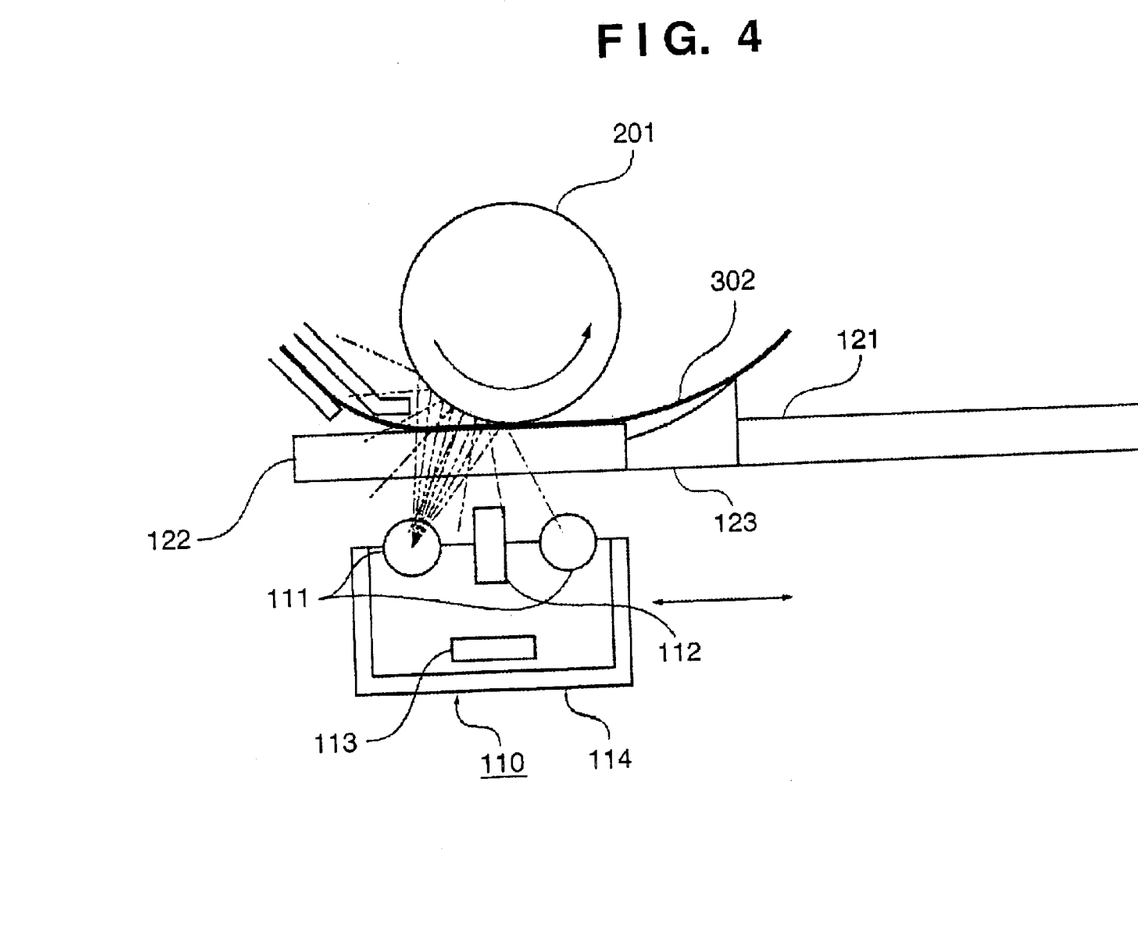
FIG. 4 is a sectional view showing in detail the sheetfed scanning section of a conventional image reading apparatus.

The effect of suppressing a decrease in luminance by arranging the white sheet member 210 of the first embodiment will be explained with reference to FIGS. 3 and 4. FIG. 4 is a sectional view showing the sheetfed scanning section of the image reading apparatus 100 having no white sheet member 210. FIGS. 3 and 4 show the path of light which is emitted by the illumination device 111 on the upstream side (left in FIGS. 3 and 4) in the original convey direction and has passed through an original 302. In reading in the sheetfed scanning mode, the original is read at a position shifted toward the upstream side in the original convey direction from a position immediately below the center of the platen roller 201.

In FIG. 3, light having passed through the original 302 is reflected toward the CIS 110 by the white sheet member 210. In FIG. 4, no white sheet member 210 is arranged, and light having passed through the original 302 is reflected in a direction in which no CIS 110 exists. In the presence of the white sheet member 210, as shown in FIG. 3, a larger quantity of light irradiates the original 302 from its lower surface. In this manner, the white sheet member 210 can suppress a decrease in luminance when the reading position in the sheetfed scanning mode shifts from a position immediately below the center of the platen roller 201 toward the upstream side in the original convey direction.

Figure 5:
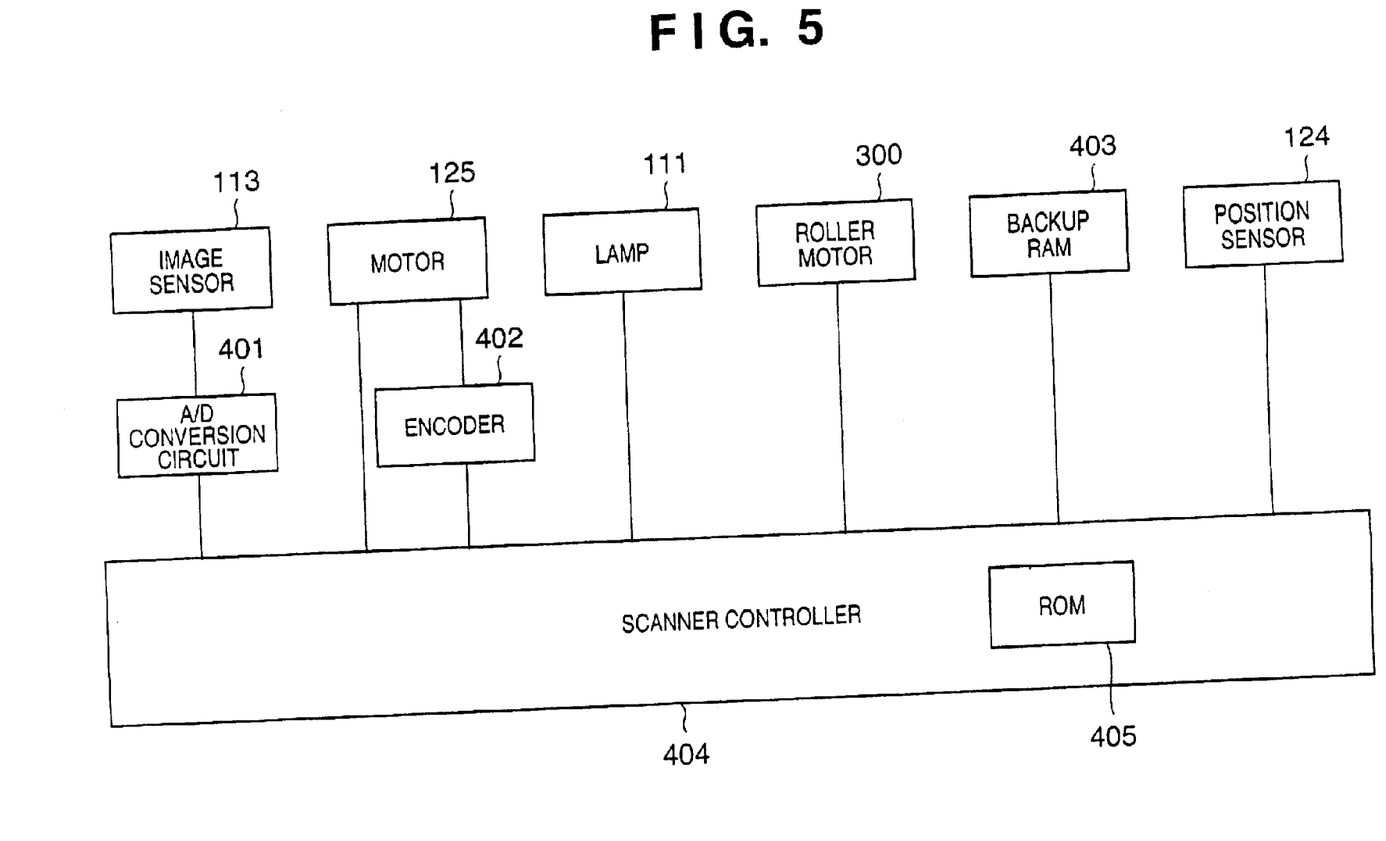
FIG. 5 is a block diagram showing the arrangement of a control system in the image reading apparatus in FIG. 1.

FIG. 5 is a block diagram showing the schematic arrangement of the control system of the image reading apparatus according to the first embodiment. The image reading apparatus comprises a roller motor 300 which rotates and drives the platen roller 201 for conveying an original, a feed roller 202, and the convey rollers 203 and 204, the motor 125 which moves the CIS 110 in the subscanning direction, the lamp 111 which emits light to an original, the image sensor 113 which photoelectrically converts light reflected by (or transmitted through) an original, an A/D conversion circuit 401 which A/D-converts an output signal from the image sensor 113, the encoder 402 which is connected to the motor 125, the position sensor 124 for positioning the CIS 110 at the home position, a backup RAM 403 for setting a normal original reading position in the ADF original reading (sheetfed scanning) mode, and a scanner controller 404 which controls the overall apparatus. The scanner controller 404 includes a ROM 405 which stores various programs such as a program corresponding to a flow chart to be described later.

The scanner controller 404 detects the position of the CIS 110 on the basis of a detection output from the position sensor 124 and an encoder pulse from the encoder 402. Also, the scanner controller 404 detects the edge position of the white sheet member 210 on the basis of an output signal from the CCD image sensor 113 that is digitized by the A/D conversion circuit 401. A position apart by a predetermined distance from the detected edge position of the white sheet member 210 is saved (set) in the backup RAM 403 as a normal original reading position in the ADF original reading mode.

Original reading position detection/setting operation in the ADF original reading mode may be performed when the ADF 200 is attached to the image reading apparatus 100, every time the operator designates reading operation in the ADF original reading mode, or when the image reading apparatus is powered on. In any case, the original reading position is not detected and set prior to reading an original every time each original is to be read. Hence, an original can be quickly read.

It is desirable to arbitrarily select the original reading position detection/setting timing by the operator. For example, the original reading position can be detected and set at an arbitrary timing by operating a predetermined key. This arrangement is effective especially when the position of the connection mechanism between the ADF 200 and the image reading apparatus 100 may shift upon touching the ADF 200 with a hand.

Figure 6:
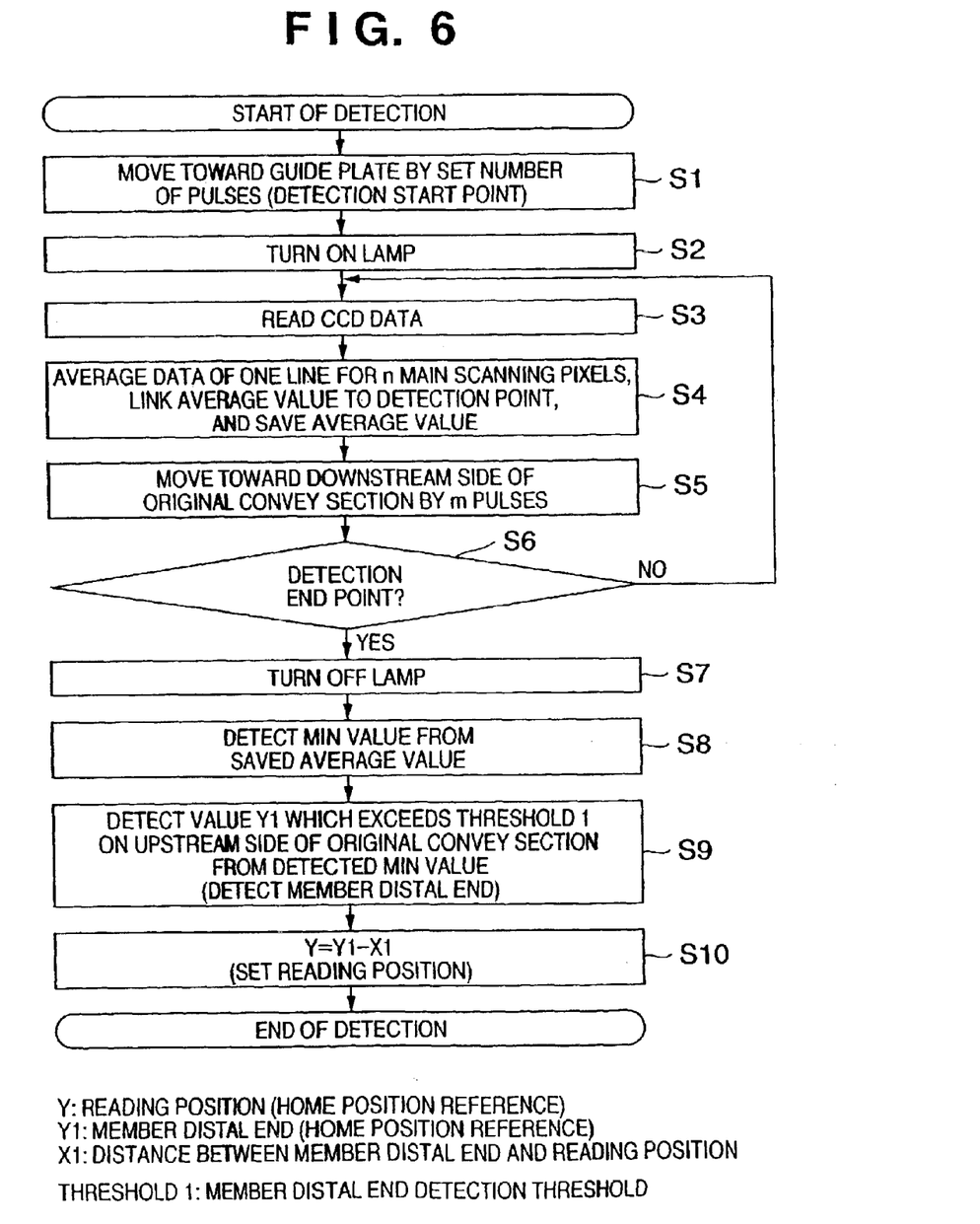
FIG. 6 is a flow chart showing original reading position setting processing according to the first embodiment of the present invention.

Processing of detecting and setting an original reading position (stop position of the CIS 110) in the ADF original reading (sheetfed scanning) mode will be described with reference to the flow chart of FIG. 6. The scanner controller 404 executes this flow chart in accordance with a program stored in the ROM 405.

The scanner controller 404 drives and controls the motor 125 to move the CIS 110 from a state in which the CIS 110 is located at a home position detected by the position sensor 124 to a position where the CIS 110 can read the white sheet member 210 in the direction of the platen roller 201 (i.e., left in FIGS. 1 and 3) by the number of pulses set in advance. After that, the scanner controller 404 stops the CIS 110 (step S1).

The scanner controller 404 turns on the lamp 111 to irradiate the platen roller 201 and white sheet member 210 (step S2), and causes the image sensor 113 to read them. The scanner controller 404 reads a signal which is output from the image sensor 113 and converted into a digital signal by the A/D conversion circuit 401 (step S3). The scanner controller 404 averages data of one line for n pixels around the center in the main scanning direction, links the average value to the detection point, and saves the average value (step S4).

The scanner controller 404 supplies m pulses to the motor 125 to move the CIS 110 toward the downstream side of the original convey section (right in FIGS. 1 and 3) (step S5). If the moving destination point is not a detection end point (step S6), the scanner controller 404 returns to step S3 to similarly execute steps S4 and S5. If the CIS 110 has reached the detection end point in step S6, the scanner controller 404 turns off the lamp 111 (step S7).

Figure 7:
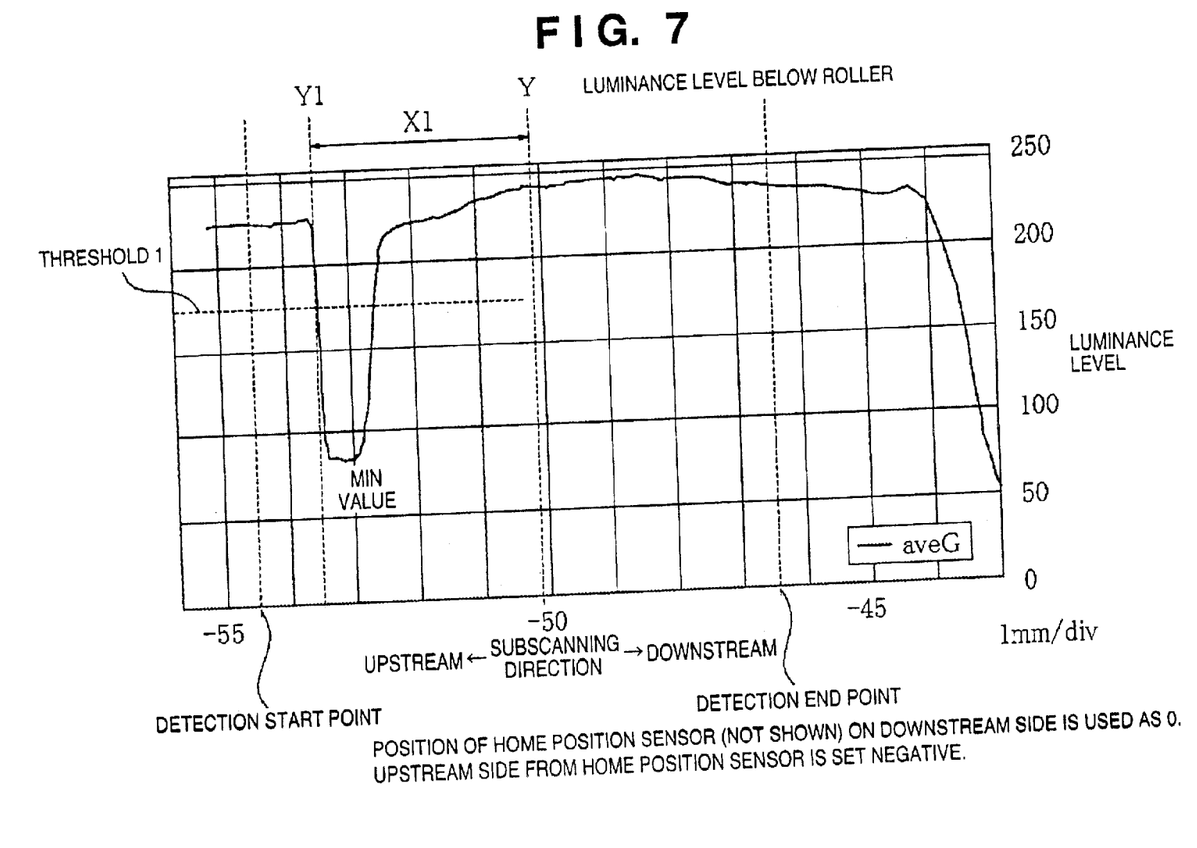
FIG. 7 is a graph showing a reading signal for explaining the first reading position detection method.

FIG. 7 is a graph showing data saved in step S4, i.e., data obtained by averaging data of n main scanning pixels output from the image sensor 113 and linking the average value to the detection point. A minimum value (MIN value) is detected from the data (step S8), and a position where the value exceeds a member distal end detection threshold (threshold 1) is detected on the upstream side of the original convey section after the position where the MIN value is detected. The detection point is set as a member distal end position Y1 (step S9).

A distance X1 from the member distal end position Y1 to the original reading position Y is set in advance. The original reading position Y is calculated by Y=Y1−X1 using the detected member distal end position Y1 and preset distance X1. The original reading position Y is saved in the backup RAM 403, ending processing of setting an original reading position (stop position of the CIS 110) in the ADF original reading (sheetfed scanning) mode (step S10). Y and Y1 in the original reading position Y=Y1−X1 are values based on the HP sensor as a reference.

In this way, the distal end of the white sheet member 210 is detected to set the original reading position Y. Even if the quantity of light reflected by the platen roller 201 hardly changes regardless of the subscanning reading position, the original reading position Y can be properly set, preventing image degradation such as a shift of the leading end of an image or a blurred image in original scanning.

As for the moving direction in detecting a distal end, the detection start point and detection end point may be replaced to perform scanning in the opposite direction.

(Second Embodiment)

Figure 8:
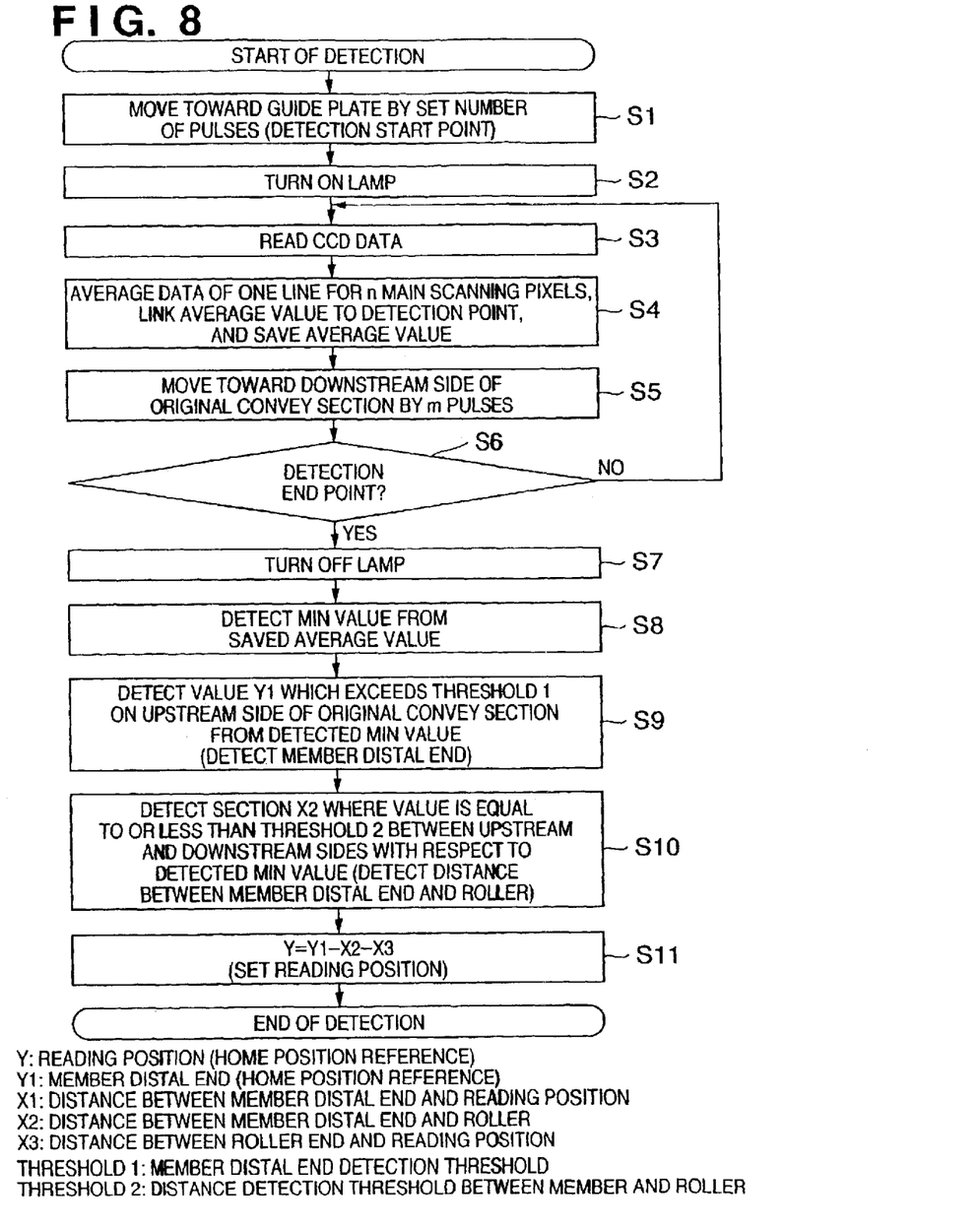
FIG. 8 is a flow chart showing original reading position setting processing according to the second embodiment of the present invention.

FIG. 8 is a flow chart showing processing of detecting and setting an original reading position (stop position of a CIS 110) in the ADF original reading (sheetfed scanning) mode according to the second embodiment. A scanner controller 404 executes this flow chart in accordance with a program stored in a ROM 405. The arrangement of an original reading apparatus is the same as that in the first embodiment, and a description thereof will be omitted.

The scanner controller 404 drives and controls a motor 125 to move the CIS 110 from a state in which the CIS 110 is located at a home position detected by a position sensor 124 to a position where the CIS 110 can read a white sheet member 210 in the direction of a platen roller 201 (i.e., left in FIGS. 1 and 3) by the number of pulses set in advance. After that, the scanner controller 404 stops the CIS 110 (step S1).

The scanner controller 404 turns on a lamp 111 to irradiate the platen roller 201 and white sheet member 210 (step S2), and causes an image sensor 113 to read them. The scanner controller 404 reads a signal which is output from the image sensor 113 and converted into a digital signal by an A/D conversion circuit 401 (step S3). The scanner controller 404 averages data of one line for n pixels around the center in the main scanning direction, links the average value to the detection point, and saves the average value (step S4).

The scanner controller 404 supplies m pulses to the motor 125 to move the CIS 110 toward the downstream side of the original convey section (right in FIGS. 1 and 3) (step S5). If the moving destination point is not a detection end point (step S6), the scanner controller 404 returns to step S3 to similarly execute steps S4 and S5. If the CIS 110 has reached the detection end point in step S6, the scanner controller 404 turns off the lamp 111 (step S7).

Figure 9:
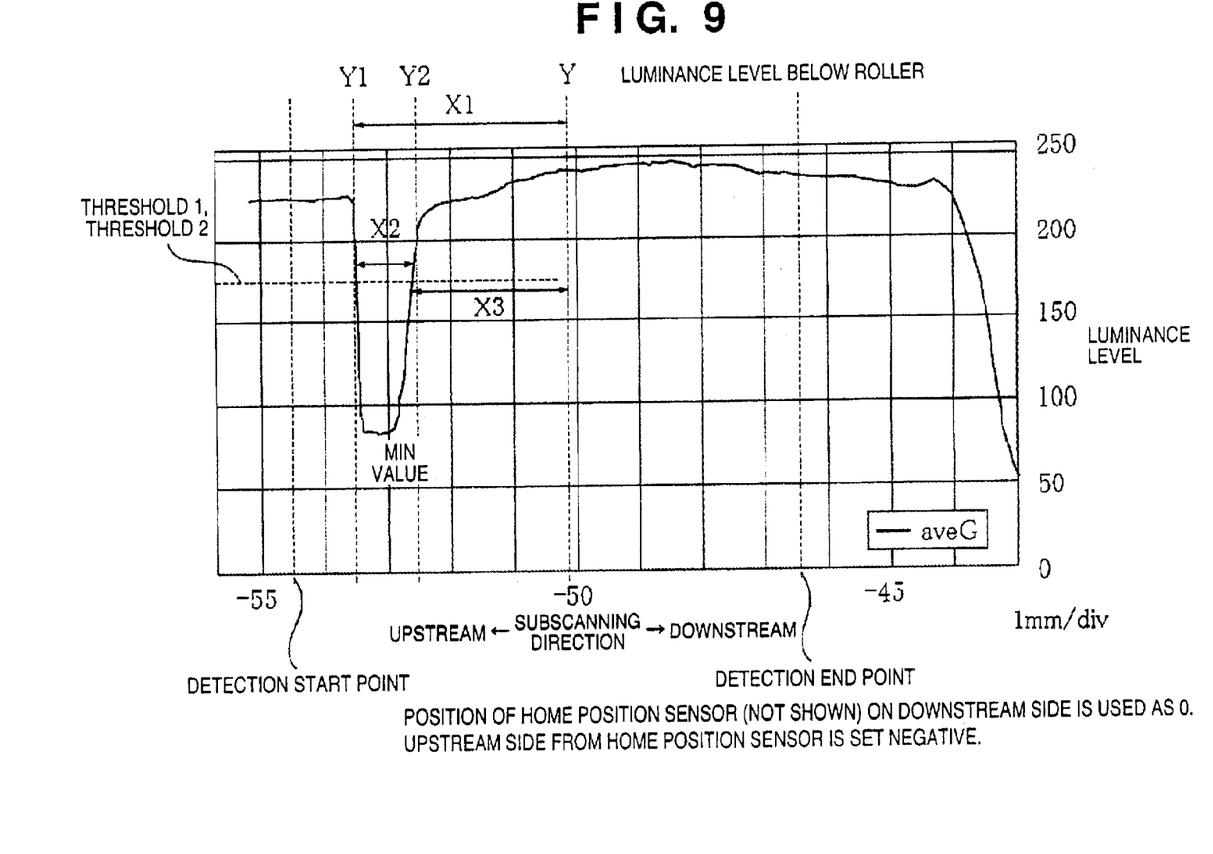
FIG. 9 is a graph showing a reading signal for explaining the second reading position detection method.

FIG. 9 is a graph showing data saved in step S4, i.e., data obtained by averaging data of n main scanning pixels output from the image sensor 113 and linking the average value to the detection point. A minimum value (MIN value) is detected from the data (step S8), and a value which exceeds a member distal end detection threshold (threshold 1) is detected on the upstream side of the original convey section after the position where the MIN value is detected. The detection point is set as a member distal end position Y1 (step S9).

A section where the value is equal to or lower than a distance detection threshold (threshold 2) between the white sheet member 210 and the platen roller 201 is detected on both the upstream and downstream sides with respect to the detected MIN value. A distance X2 from the white sheet member distal end position Y1 to a white sheet side end position Y2 of the platen roller 201 is detected (step S10).

A distance X3 from the white sheet member side end position Y2 of the platen roller 201 to the original reading position Y is set in advance. The original reading position Y is calculated by Y=Y1−X2−X3 using the detected member distal end position Y1 and the distance X2 from Y1 to the end position Y2 of the platen roller 201. The original reading position Y is saved in a backup RAM 403, ending processing of setting an original reading position (stop position of the CIS 110) in the ADF original reading (sheetfed scanning) mode (step S11).

Y and Y1 in the original reading position Y=Y1−X2−X3 are values based on the HP sensor as a reference.

Member distal end detection threshold 1 and distance detection threshold 2 are equal to each other in the above description, but different thresholds may be set.

As for the moving direction in detecting a distal end, the detection start point and detection end point may be replaced to perform scanning in the opposite direction.

(Third Embodiment)

The object of the above-described embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described flow charts.

As has been described above, according to the above-described embodiments, the stop position (original reading position) of the optical scanning device can be properly set regardless of contamination of the platen roller, electrical noise of the original reading apparatus main body, or the like even when the reflected light quantity is small upon scanning the platen roller with the optical scanning device.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
   an optical scanning device which optically scans an original;
   a moving device which moves a position of said optical scanning device;
   a photoelectric conversion device which photoelectrically converts an optical image obtained by said optical scanning device;
   a platen roller which conveys the original;
   a sheet member which is arranged near said platen roller;
   a detection device which detects an end position of said sheet member by scanning said sheet member and reading said sheet member by said photoelectrical conversion device while moving the position of said optical scanning device by said moving device; and
   a setting device which sets, on the basis of a detection result of said detection device, a stop position of said optical scanning device when the original conveyed by said platen roller is read by said photoelectric conversion device while said optical scanning device stops.

2. The apparatus according to claim 1, wherein said sheet member includes a polyester film.

3. The apparatus according to claim 1, wherein said sheet member is arranged on an upstream side in an original convey direction of said platen roller.

4. The apparatus according to claim 1, wherein said setting device sets, as the stop position of said optical scanning device, a position apart by a predetermined distance from the end position of said sheet member that is detected by said detection device.

5. The apparatus according to claim 1, wherein said detection device detects the end position of said sheet member by comparing, with a predetermined threshold, data obtained by scanning said platen roller and said sheet member by said optical scanning device and reading said platen roller and said sheet member by said photoelectric conversion device.

6. A control program for controlling an image reading apparatus having an optical scanning device which optically scans an original, a moving device which moves a position of the optical scanning device, a photoelectric conversion device which photoelectrically converts an optical image obtained by the optical scanning device, a platen roller which conveys the original, and a sheet member which is arranged near the platen roller, comprising:
   a detection step of scanning the sheet member while moving the position of the optical scanning device by the moving device, reading the sheet member by the photoelectrical conversion device, and detecting an end position of the sheet member; and
   a setting step of setting, on the basis of a detection result in the detection step, a stop position of the optical scanning device when the original conveyed by the platen roller is read by the photoelectric conversion device while the optical scanning device stops.

7. The program according to claim 6, wherein the sheet member includes a polyester film.

8. The program according to claim 6, wherein the sheet member is arranged on an upstream side in an original convey direction of the platen roller.

9. The program according to claim 6, wherein in the setting step, a position apart by a predetermined distance from the end position of the sheet member that is detected in the detection step is set as the stop position of the optical scanning device.

10. The program according to claim 6, wherein in the detection step, the end position of the sheet member is detected by comparing, with a predetermined threshold, data obtained by scanning the platen roller and the sheet member by the optical scanning device and reading the platen roller and the sheet member by the photoelectric conversion device.

* * * * *